(12) United States Patent
Guadalupe

(10) Patent No.: US 12,471,583 B2
(45) Date of Patent: Nov. 18, 2025

(54) FISHING LURES CONFIGURED TO JUMP AND FLY

(71) Applicant: Armando Guadalupe, Bend, OR (US)

(72) Inventor: Armando Guadalupe, Bend, OR (US)

( * ) Notice: Subject to any disclaimer, the term of this patent is extended or adjusted under 35 U.S.C. 154(b) by 108 days.

(21) Appl. No.: 18/126,330

(22) Filed: Mar. 24, 2023

(65) Prior Publication Data
US 2023/0354791 A1 Nov. 9, 2023

Related U.S. Application Data

(60) Provisional application No. 63/338,334, filed on May 4, 2022.

(51) Int. Cl.
*A01K 85/18* (2006.01)
*A01K 85/00* (2006.01)

(52) U.S. Cl.
CPC .......... *A01K 85/1817* (2022.02); *A01K 85/18* (2013.01); *A01K 85/1807* (2022.02); *A01K 85/1851* (2022.02); *A01K 85/1861* (2022.02)

(58) Field of Classification Search
CPC ............... A01K 85/18; A01K 85/1817; A01K 85/1813; A01K 85/1811; A01K 85/1851; A01K 85/1861
See application file for complete search history.

(56) References Cited

U.S. PATENT DOCUMENTS

| | | | | |
|---|---|---|---|---|
| 1,309,061 A | * | 7/1919 | Cassedy ................. | A01K 85/16 43/42.27 |
| 1,510,923 A | | 10/1924 | Cosey | |
| 1,557,644 A | * | 10/1925 | Andersen ............... | A01K 85/18 43/42.49 |
| 2,244,032 A | * | 6/1941 | Timm ..................... | A01K 85/18 43/42.47 |
| 2,543,464 A | | 2/1951 | McPherson | |
| 2,876,580 A | * | 3/1959 | Schwartztrauber .... | A01K 85/18 43/42.31 |
| 2,883,787 A | * | 4/1959 | Dahl ...................... | A01K 85/16 43/42.22 |
| 3,427,744 A | * | 2/1969 | Roberts .................. | A01K 85/18 43/42.39 |

(Continued)

OTHER PUBLICATIONS

International Search Report and Written Opinion, PCT/US2023/018062, dated Jul. 19, 2023, by International Searching Authority.

*Primary Examiner* — Magdalena Topolski
(74) *Attorney, Agent, or Firm* — Mohr Intellectual Property Law Solutions, PC

(57) ABSTRACT

Fishing lures including a front body, a middle body, an aft body, a first wing, and a second wing. The front body has an aerodynamic and hydrodynamic profile and is positively buoyant in water. The front body extends along a longitudinal axis from a first end to a second end and extends along a lateral axis from a first lateral side to a second lateral side. The middle body extends along the longitudinal axis from a third end proximate the second end to a fourth end. The aft body is coupled to the middle body proximate the fourth end and defines a hook opening. The hook opening receives a hook projecting beyond an outer surface of the aft body. The first wing and the second wing are coupled to the front body and disposed on the first lateral side and the second lateral side, respectively.

16 Claims, 15 Drawing Sheets

(56) References Cited

U.S. PATENT DOCUMENTS

| | | | | |
|---|---|---|---|---|
| 4,654,995 A | * | 4/1987 | Rapelje | .................. A01K 85/18 43/42.15 |
| 4,959,920 A | * | 10/1990 | Walker | .................. A01K 85/18 43/42.47 |
| 6,546,663 B1 | | 4/2003 | Signitzer | |
| 6,865,842 B2 | | 3/2005 | Brinkman | |
| 8,646,203 B2 | | 2/2014 | Pennaz | |
| 10,701,914 B2 | | 7/2020 | Gilbert | |
| 2017/0000097 A1 | * | 1/2017 | Thomas | .................. A01K 85/01 |
| 2021/0076650 A1 | | 3/2021 | Bingham | |

* cited by examiner

FISHING LURES CONFIGURED TO JUMP AND FLY

CROSS REFERENCE TO RELATED APPLICATIONS

This application claims priority to copending U.S. Application Ser. No. 63/338,334, filed on May 4, 2022, which is hereby incorporated by reference for all purposes.

BACKGROUND

The present disclosure relates generally to fishing lures. In particular, fishing lures configured to jump and fly are described.

Fishing lures are useful and popular fishing aids. A fishing lure mounts to a fishing line and mimics a prey animal or insect. A fishing lure induces a fish to capture the fishing lure in its mouth and to become hooked on a fishing hook in the process. There are many different types of fishing lures.

Keeping fishing lures aloft near the surface of the water is an effective fishing technique for certain types of fish. Fishing lures that remain aloft near the surface of the water and/or that appear to jump from the surface of the water mimic certain prey species of animals and insects.

Known fishing lures are not entirely satisfactory. For example, conventional fishing lures typically require external lifting forces, such as kites or balloons, to keep them aloft. It would be desirable to have a fishing lure that could remain aloft or resume flying without an external lifting force applied to it from a kite or a balloon.

Further, existing fishing lures do not fly through the air effectively. Conventional fishing lures lack aerodynamic design features to aid their flying abilities, such as wings, means to dynamically adjust their center of mass, or stabilizing features.

Another limitation of conventional fishing lures is that they fail to resume flying after making contact with the water. Instead of regaining altitude above the surface of the water, conventional fishing lures tend to become stuck on the surface of the water and unable to resume flying. It would be desirable to have a fishing lures that was able to resume flying after making contact with water. Further, it would be advantageous to have a fishing lure that could mimic the action of certain prey fish that jump out of the water.

Another shortcoming of conventional fishing lures is that they do not move through water effectively. Indeed, conventional fishing lures lack hydrodynamic design features to aid their maneuverability in water. For example, conventional fishing lures are prone to rotate upside down or into less than ideal orientations due to forces of water and/or air acting on them. Conventional fishing lures are especially prone to problematic orientation when submerged after being aloft.

A further limitation of conventional fishing lures is that they suffer damage from hard landings after being aloft. Conventional fishing lures lack shock absorbing means to soften landings when contacting water after being airborne. It would be desirable to have a fishing lure that incorporated shock absorption into its design to soften landings and to reduce the potential for damage.

Another limitation of conventional fishing lures is that they are prone to being damaged by a fish after the fish is hooked by a fishing hook. Conventional fishing lures tend to keep the fishing lure close to the hook and the fish, which subjects the fishing lure to damage as the fish thrashes violently seeking to resist being captured. It would be desirable to have a fishing lure configured to space itself from a thrashing fish once the fish was hooked.

Thus, there exists a need for fishing lures that improve upon and advance the design of known fishing lures. Examples of new and useful fishing lures relevant to the needs existing in the field are discussed below.

SUMMARY

The present disclosure is directed to fishing lures including a front body, a middle body, an aft body, a first wing, and a second wing. The front body has an aerodynamic and hydrodynamic profile and is positively buoyant in water. The front body extends along a longitudinal axis from a first end to a second end and extends along a lateral axis from a first lateral side to a second lateral side. The middle body extends along the longitudinal axis from a third end proximate the second end to a fourth end. The aft body is coupled to the middle body proximate the fourth end and defines a hook opening. The hook opening is configured to receive a hook projecting beyond an outer surface of the aft body. The second wing is coupled to the front body and is disposed on the second lateral side. The first wing is coupled to the front body and is disposed on the first lateral side.

In some examples, the first wing is pivotally coupled to the front body. In select embodiments, the second wing is pivotally coupled to the front body. As described below, in particular instances the second wing is biased to pivot toward the bottom side.

In some examples, the first wing and the second wing are positively buoyant in water. In certain examples, the fishing lure includes a hinge coupled to the front body, the first wing, and the second wing.

This document describes certain examples where the first wing and the second wing are configured to pivot towards the top side to at least vertical orientations when the fishing lure is submerged underwater to propel the lure out of the water right side up due to their positive buoyancy and to stabilize the fishing lure on the water by resisting rolling.

This document describes certain examples where the front body extends along a vertical axis from a bottom side to a top side and the first wing is biased to pivot toward the bottom side.

In select embodiments, the front body extends along a vertical axis from a bottom side to a top side and the middle body is biased to pivot toward the bottom side into a biased position.

As described below, in particular instances the positive buoyancy of the front body and the bias of the middle body are complementarily configured and cooperate to cause the fishing lure to jump out of the water when submerged due to the positive buoyancy of the front body pivoting the middle body from the biased position to a loaded position until the fishing lure reaches the surface of the water and the bias of the middle body pushes the front body against the surface of the water to return to the biased position.

In some examples, the middle body defines a middle cavity extending along the longitudinal axis from a first cavity opening proximate the third end to a second cavity opening proximate the fourth end. This document describes certain examples where the middle cavity is complementarily configured with a fishing line to allow the fishing line to pass through the middle cavity. In select embodiments, the middle cavity is complementarily configured with a fishing hook to restrict the fishing hook from passing entirely through the middle cavity.

As described below, in particular instances the aft body defines an aft cavity extending from the hook opening and complimentarily configured with a fishing line to allow the fishing line to move within the aft cavity. In some examples, the aft cavity extends along the longitudinal axis.

This document describes certain examples where the aft body extends along the longitudinal axis from a fifth end proximate the middle body to a sixth end distal the middle body. The hook opening may be disposed between the fifth end and the sixth end, and the aft cavity may extend from the hook opening toward the sixth end. In select embodiments, the aft cavity also extends from the hook opening toward the fifth end.

As described below, in particular instances the aft body extends along the longitudinal axis from a fifth end proximate the middle body to a sixth end distal the middle body, and the fishing lure includes a first tail fin coupled to the aft body proximate the sixth end. In some examples, the fishing lure further comprises a second tail fin coupled to the aft body proximate the sixth end, the first tail fin extends to the first lateral side, and the second tail fin extends to the second lateral side. In certain examples, the aft body couples to the middle body via an interference fit.

DETAILED DESCRIPTION

Figure 1:
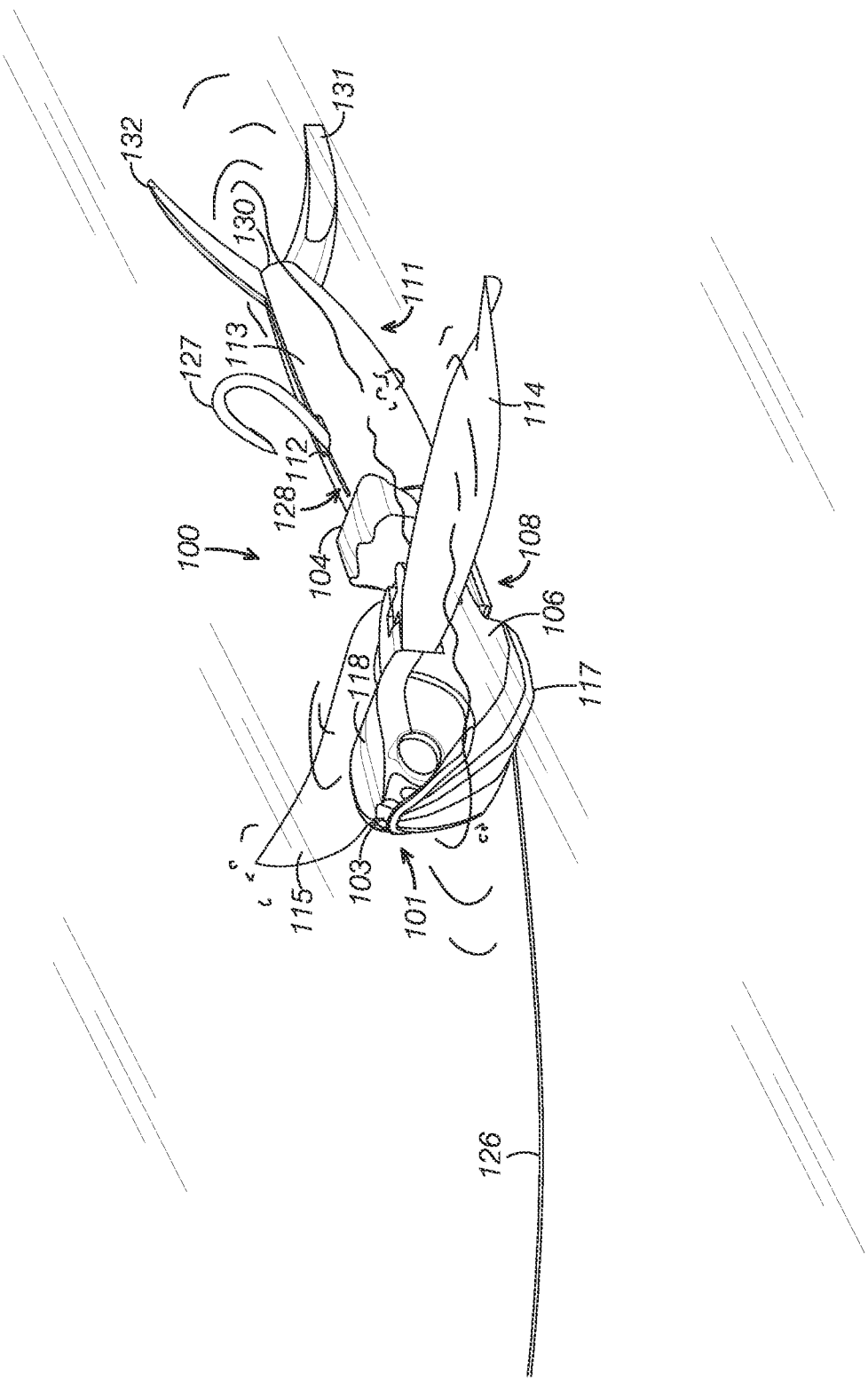
FIG. 1 is a perspective view of a fishing lure being pulled along the surface of water by a fishing line with a hook projecting from a hook opening of an aft body.
Figure 2:
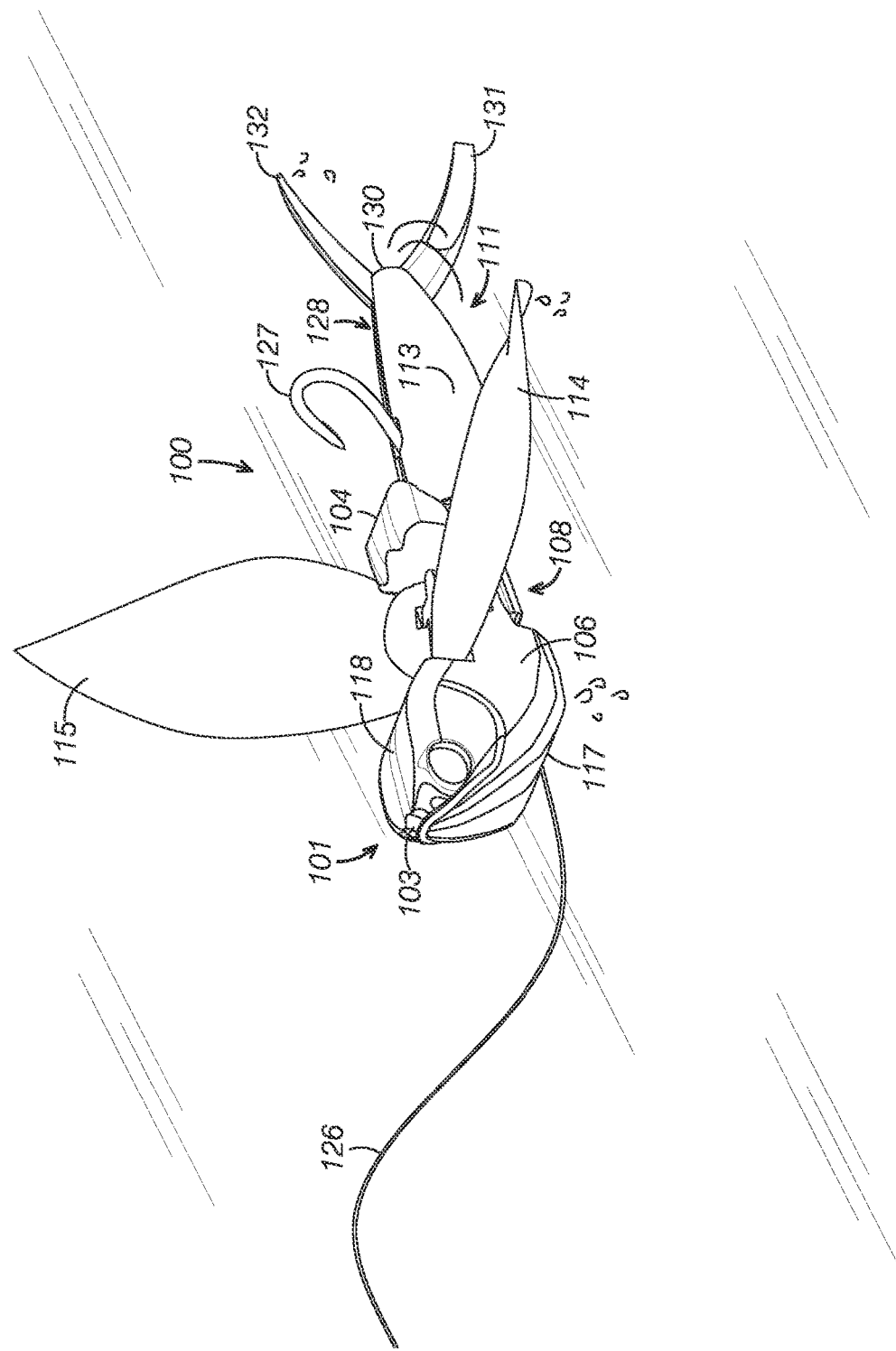
FIG. 2 is a perspective view of the fishing lure shown in FIG. 1 flying above the water when pulled by the fishing line.

The disclosed fishing lures will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various fishing lures are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identity various members of a group, or the like, and are not intended to denote a serial, chronological, or numerical limitation.

"Coupled" means connected, either permanently or releasably, whether directly or indirectly through intervening components.

Fishing Lures Configured to Jump and Fly

With reference to the figures, fishing lures configured to jump and fly will now be described. The fishing lures discussed herein function to lure and catch fish when used with a fishing line and hook. The fishing lures described below are also configured to jump into the air from the surface of water and to fly through the air when an airstream moves relative to the fishing lure, such as when the fishing lure is pulled behind a boat.

The reader will appreciate from the figures and description below that the presently disclosed fishing lures address many of the shortcomings of conventional fishing lures. For example, the novel fishing lures described below remain aloft near the surface of the water and/or appear to jump from the surface of the water to effectively mimic certain prey species of animals and insects. Importantly, the novel fishing lures described herein do not require external lifting forces, such as kites or balloons, to keep them aloft.

Another improvement over conventional fishing lures is that the novel fishing lures described below include aerodynamic design features to aid their flying abilities. For example, the novel fishing lures include features to dynamically adjust their center of mass, wings to generate lift, and stabilizing features to maintain a desired orientation in the air.

The novel fishing lures described herein are configured to resume flying after making contact with the water. Unlike conventional fishing lures that tend to become stuck on the surface of the water and that are unable to resume flying, the novel fishing lures are configured to jump into the air after being submerged to resume flying. As a result, the novel fishing lures more effectively mimic the action of certain prey fish that jump out of the water.

The novel fishing lures discussed in this document are configured to move through water effectively and include hydrodynamic design features to aid their maneuverability in water. As a result, the novel fishing lures resist rotating upside down or into less than ideal orientations due to forces of water and/or air acting on them.

The novel fishing lures described herein avoid suffering damage from contacting the surface of water after being aloft. Shock absorbing means present in the novel fishing lures helps them to soften landings when contacting water after being aloft.

The novel fishing lures described in this document are less prone to being damaged by a fish after the fish is hooked by a fishing hook than conventional fishing lures. Advantageously, the novel fishing lures are configured to space themselves from a thrashing fish once the fish is hooked.

Contextual Details

Ancillary features relevant to the fishing lures described herein will first be described to provide context and to aid the discussion of the fishing lures.

Fishing Line

The fishing lures described below are typically used with fishing line, such as fishing line 126 depicted in FIGS. 1, 2, 5-7, and 14. In particular, the fishing lures are mounted to a fishing line by passing the fishing line through the fishing lure. The fishing lure may be pulled by the fishing line behind a boat and/or may be retained by the fishing line.

The fishing line may be any currently known or later developed type of fishing line. Various fishing line types exist and could be used in place of the fishing line shown in the figures. In addition to the types of fishing lines existing currently, it is contemplated that the fishing lures described herein could be used with new types of fishing lines developed in the future.

In the present example, the fishing line is composed of nylon. However, the fishing line may be composed of any currently known or later developed material suitable for fishing applications.

Fishing Hook

The fishing lures described below are often used with fishing hooks, such as fishing hook 127 depicted in FIGS. 1, 2, 5-7, and 15. For example, a fishing hook is typically secured to a fishing line on which the fishing lure is mounted. The fishing hook may be positioned partially within the fishing lure with a pointed end of the hook extending beyond the fishing lure. When a fish is attracted to the fishing lure and places its mouth around the fishing lure, the sharp end of the hook extending from the fishing lure will pierce the fish's mouth and cause the hook to hook the fish.

The fishing hook may be any currently known or later developed type of fishing hook. Various fishing hook types exist and could be used in place of the fishing hook shown in the figures. In addition to the types of fishing hooks existing currently, it is contemplated that the fishing lures described herein could be used with new types of fishing hooks developed in the future.

The number of fishing hooks used with the fishing lure may be selected to meet the needs of a given fishing technique or application. The reader should appreciate that the number of fishing hooks may be different in other examples than is shown in the figures. For example, in some instances more than one fishing hook may be used with the fishing lures described below.

The size and shape of the fishing hook may be varied as needed for a given fishing application. In some examples, the fishing hook is larger relative to the fishing lure than depicted in the figures. In other examples, the fishing hook is smaller relative to the fishing lure than depicted in the figures. Further, the fishing hook and the fishing lure may all be larger or smaller than described herein while maintaining their relative proportions.

In the present example, the fishing hook is composed of metal. However, the fishing hook may be composed of any currently known or later developed material suitable for fishing applications. Suitable materials include metals, polymers, wood, and composite materials.

Fishing Lure Example

With reference to FIGS. 1-15, a fishing lure 100 will now be described as a first example of a fishing lure. As shown in FIGS. 1-15, fishing lure 100 includes a front body 101, a middle body 108, an aft body 111, a first wing 114, a second wing 115, a hinge 119, a first tail fin 131, and a second tail fin 132. The components of fishing lure 100 are described in more detail in the sections below.

In other examples, the fishing lure includes fewer components than depicted in the figures. In certain examples, the fishing lure includes additional or alternative components than depicted in the figures.

The size and shape of the fishing lure may be varied as needed for a given application. In some examples, the fishing lure is larger relative to the other components than depicted in the figures. In other examples, the fishing lure is smaller relative to the other components than depicted in the figures. Further, the fishing lure and the other components may all be larger or smaller than described herein while maintaining their relative proportions.

Front Body

The role of front body 101 is to facilitate fishing lure 100 moving efficiently through air and water. Further, front body 101 function to support other components of fishing lure 100, such as hinge 119, first wing 114, and second wing 115. Front body 101 also helps guide fishing line 126 through fishing lure 100. Through interaction with fishing line 126, front body 101 helps maintain fishing lure 100 in a desired angle of attack for achieving flight and moving through the water effectively.

As shown in FIGS. 1-13, front body 101 has an aerodynamic and hydrodynamic profile to assist fishing lure 100 moving through the air and water, respectively. As shown in FIGS. 1-13, front body 101 includes a hydrofoil and other shape characteristics to assist fishing lure 100 moving through the water effectively. The shape characteristics of front body 101 are also configured to assist fishing lure 100 glide and fly through the air.

Figure 5:
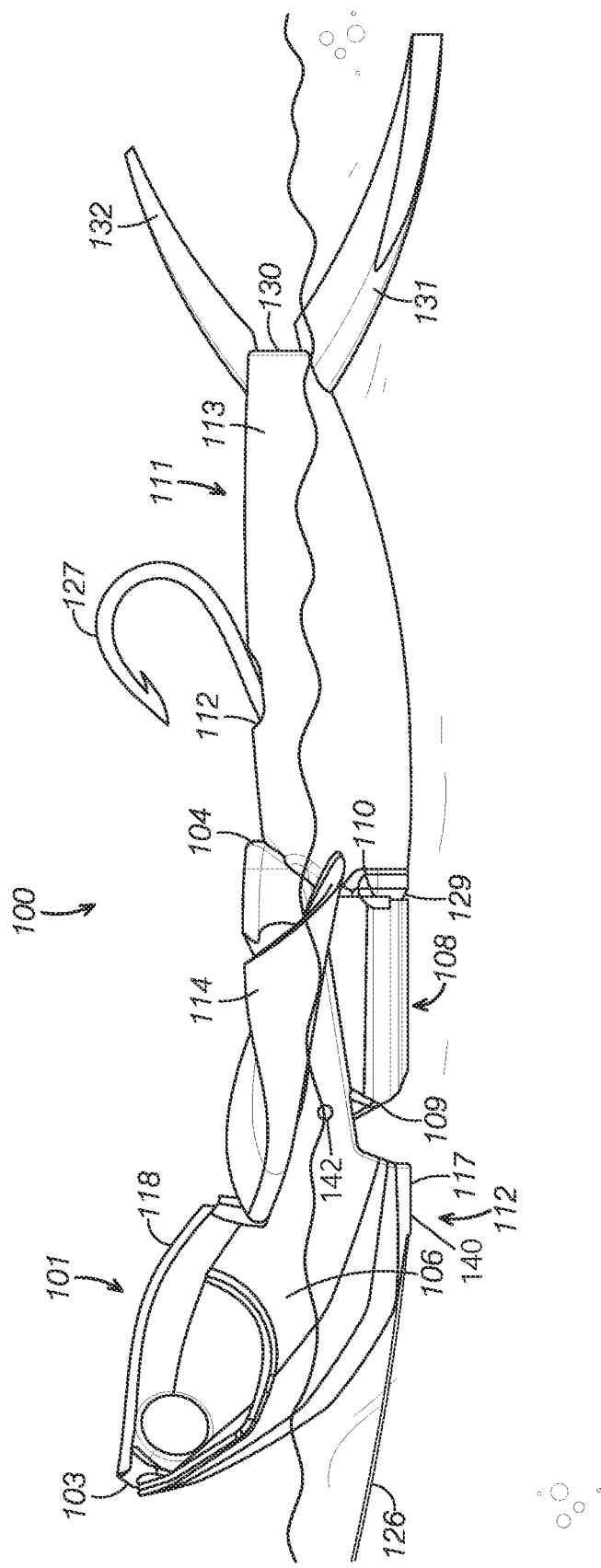
FIG. 5 is a side elevation view of the fishing lure shown in FIG. 1 depicted at the surface of the water with the front body tilted upwards into a loaded position.
Figure 6:
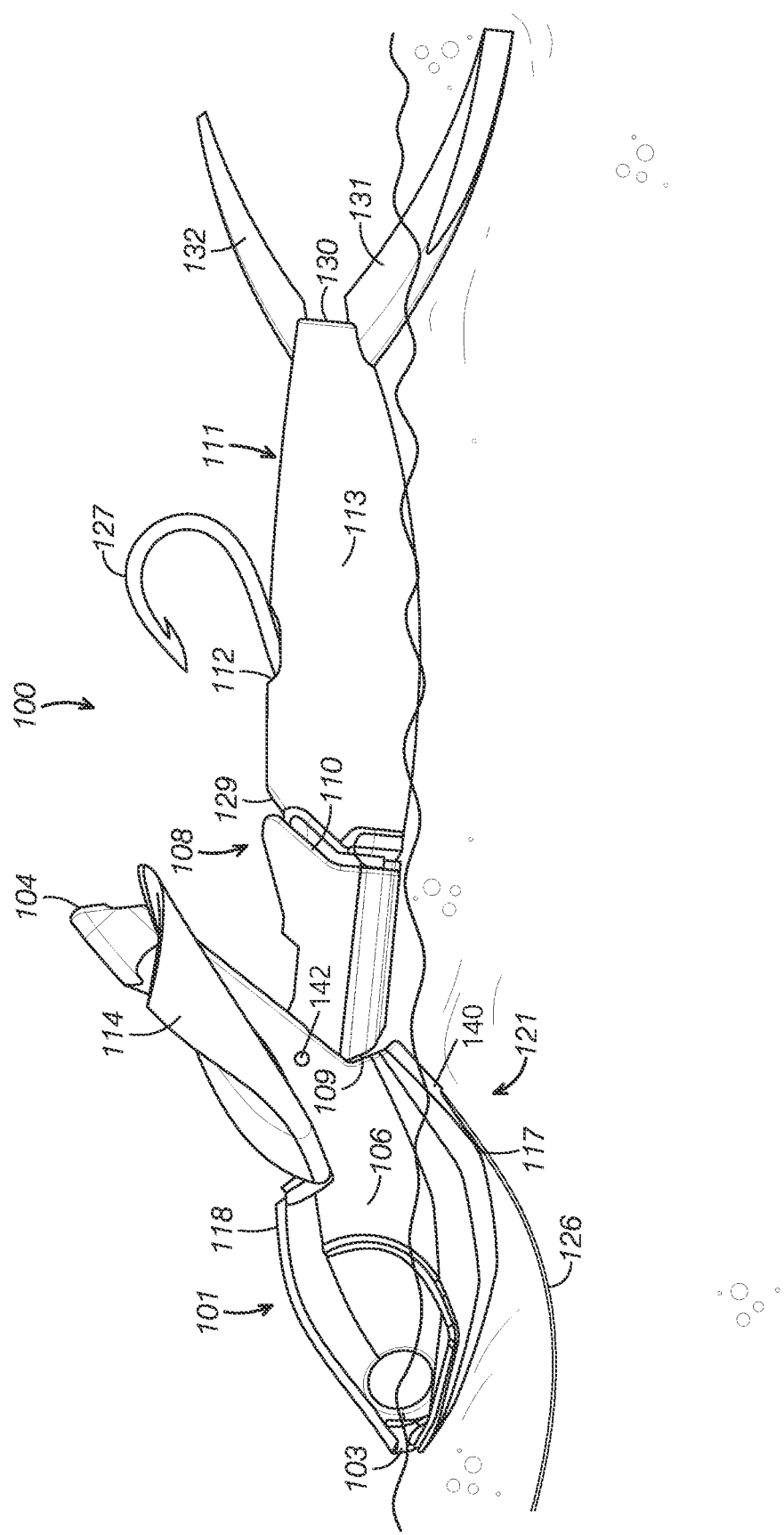
FIG. 6 is a side elevation view of the fishing lure shown in FIG. 1 depicted at the surface of the water with the front body tilted downwards into a biased position and pressing on the surface of the water to jump above the water.
Figure 7:
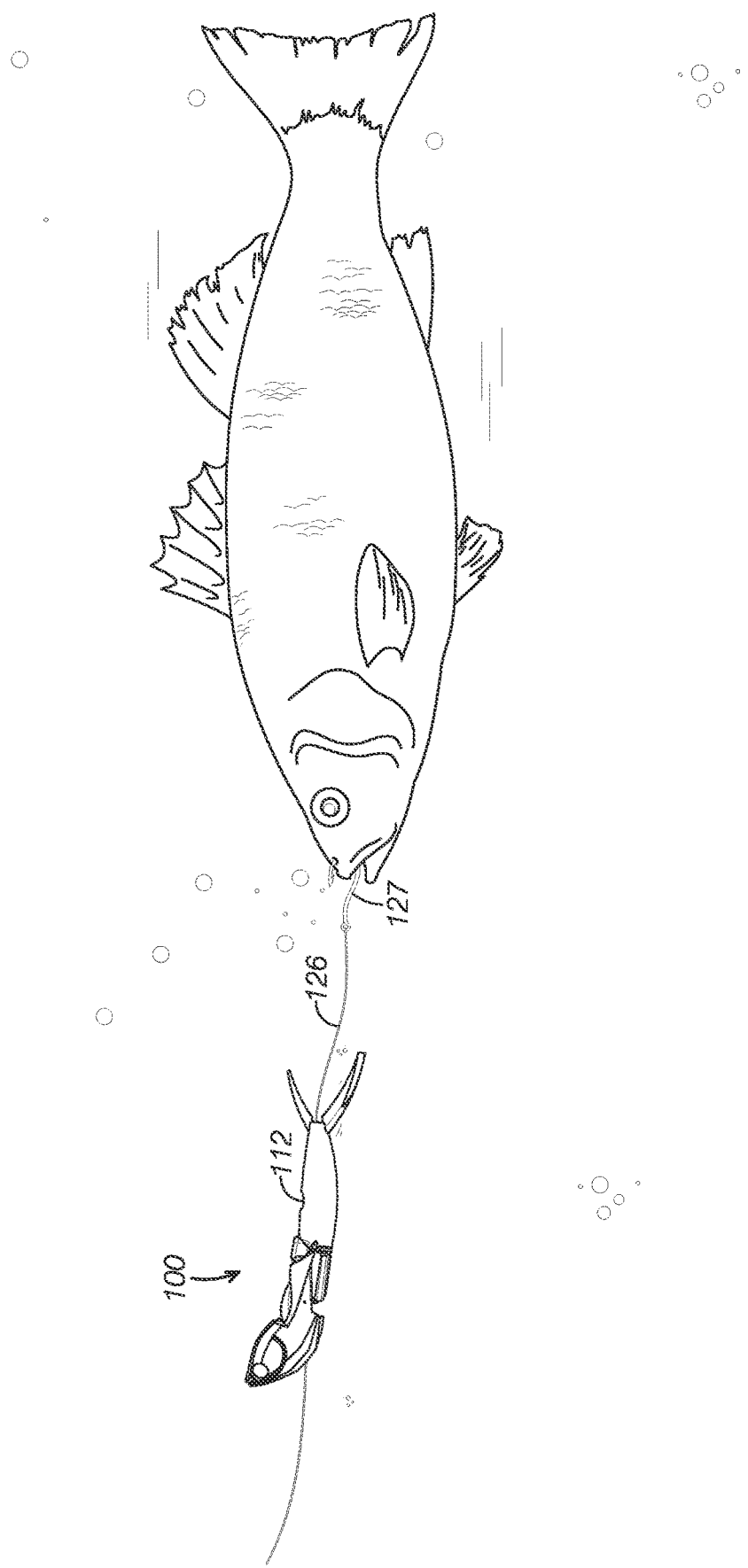
FIG. 7 is a side elevation view of the fishing lure shown in FIG. 1 depicting a fish with the hook in its mouth and the fishing lure slid away from the fish along the fishing line to avoid damage from the fish.
Figure 8:
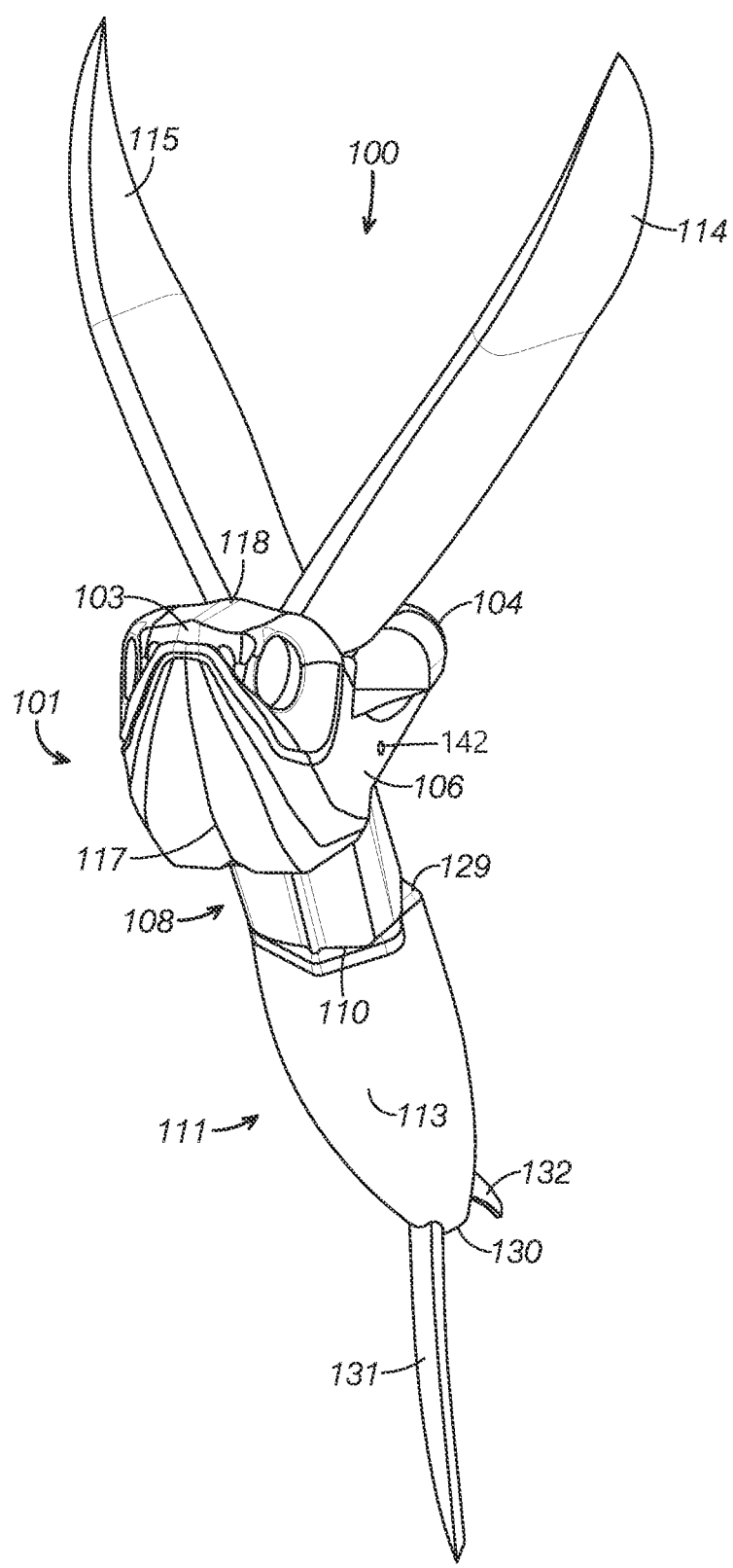
FIG. 8 is a perspective view of the fishing lure shown in FIG. 1 with the wings pivoted upwards and the front body pivoted downwards.
Figure 9:
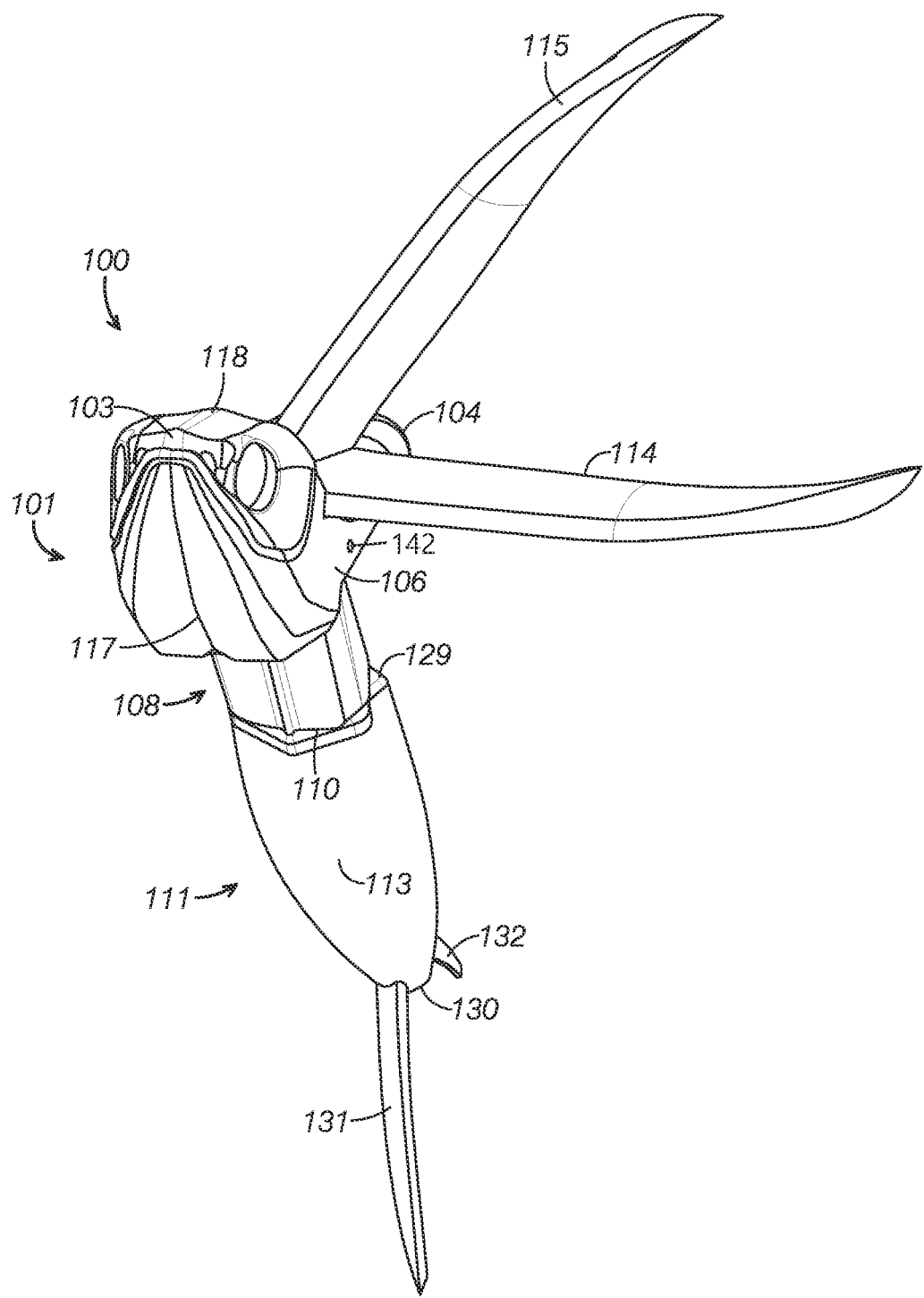
FIG. 9 is a perspective view of the fishing lure shown in FIG. 1 with one wing pivoted upwards and the other wing pivoted downwards.
Figure 10:
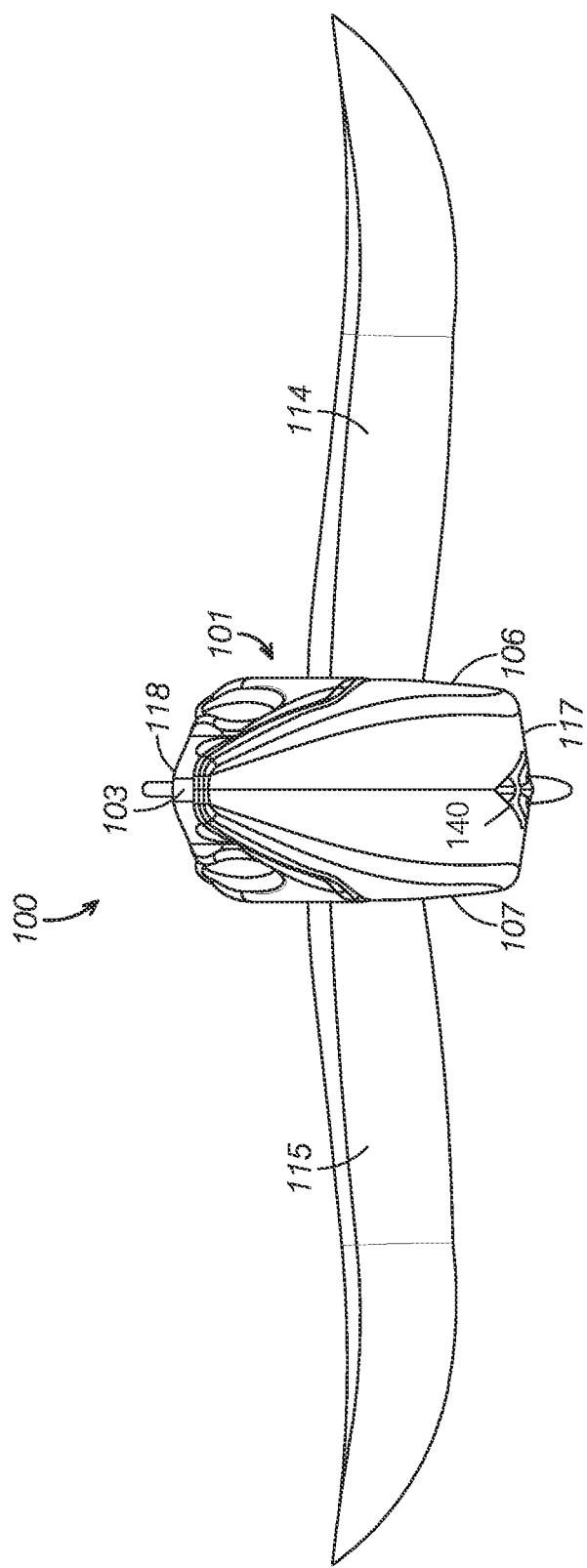
FIG. 10 is a front elevation view of the fishing lure shown in FIG. 1.
Figure 11:
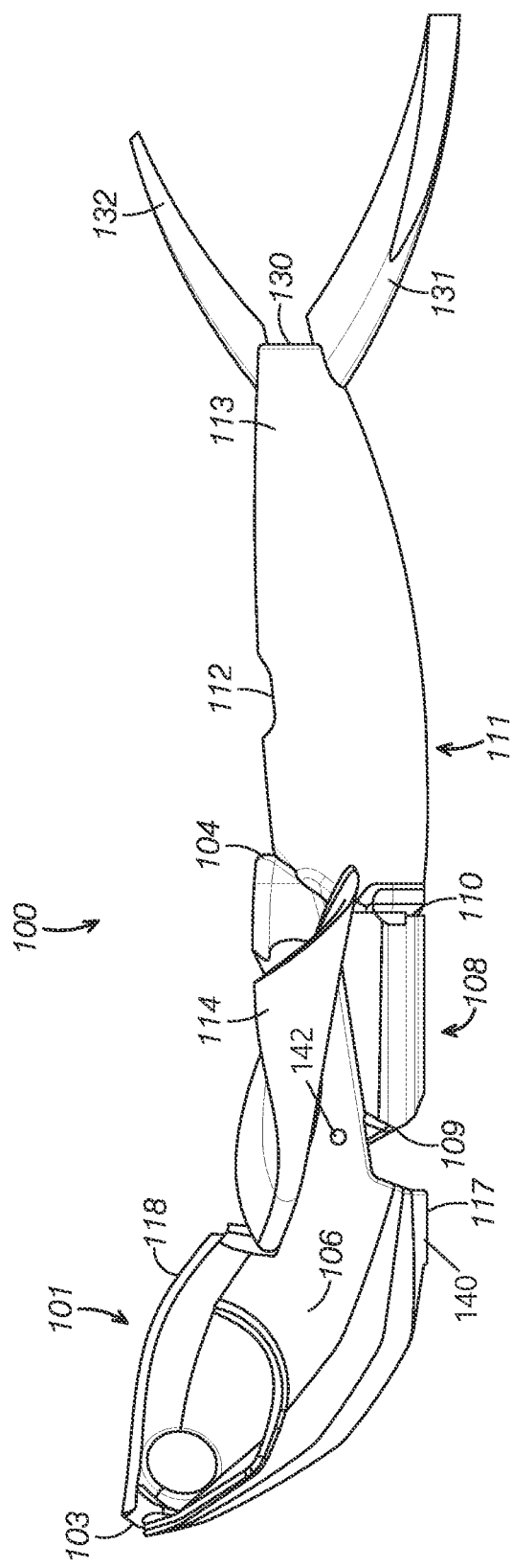
FIG. 11 is a left side elevation view of the fishing lure shown in FIG. 1.

As can be seen in FIGS. 5 and 6, front body 101 defines a line guide 140 through which fishing line 126 passes through. Line guide 140 helps route fishing line 126 to a middle cavity 123 of middle body 108. Line guide 140 also helps front body 101 cooperate with fishing line 126 to maintain a proper angle of attack for flight and traveling through the water as well as to control pitch and yaw.

Front body 101 is positively buoyant in water. As depicted in FIG. 6, the positive buoyancy of front body 101 and the bias of middle body 108 are complementarily configured and cooperate to cause fishing lure 100 to jump out of the water. Fishing lure 100 is configured to lump out of the water in two primary stages. The first stage occurs when fishing lure 100 is submerged and the second stage occurs when fishing lure 100 surfaces.

In the first stage, the positive buoyancy of submerged front body 101 pivots middle body 108 from biased position 121 shown in FIG. 6 to a loaded position 122 shown in FIG. 5. At stage two when fishing lure 100 reaches the surface, the bias of middle body 108 pushes front body 101 against the surface of the water to return to biased position 121. Middle body 108 pushing front body 101 against the water surface causes fishing lure to jump up or buck from the surface of the water.

With reference to FIGS. 1-13, front body 101 extends along a longitudinal axis. In the present example, front body 101 extends along the longitudinal axis from a first end 103 to a second end 104. Front body 101 couples to middle body 108 via an internal spring hinge mechanism (not pictured) that allows front body 101 and middle body 108 to pivot relative to each other and to be biased into biased position 121 shown in FIG. 6. A pivot shaft 142 of the internal spring hinge mechanism is depicted in FIGS. 5 and 6. The reader can see in FIGS. 5 and 6 that pivot shaft 142 is disposed proximate the wings' center of lift, which aids in flight stability and balance.

The reader can further see in the figures that front body 101 also extends along a lateral axis. The lateral axis is perpendicular to the longitudinal axis. Front body 101 extends along the lateral axis from a first lateral side 106 to a second lateral side 107.

As shown in FIGS. 1-13, front body 101 extends along a vertical axis as well. The vertical axis is perpendicular to the longitudinal axis and also perpendicular to lateral axis. Front body 101 extends along the vertical axis from a bottom side 117 to a top side 118.

The size and shape of the front body may be varied as needed for a given application. In some examples, the front body is larger relative to the other components than depicted in the figures. In other examples, the front body is smaller relative to the other components than depicted in the figures. Further, the front body and the other components may all be larger or smaller than described herein while maintaining their relative proportions.

The front body may be composed of any currently known or later developed material suitable for fishing lure applications. Suitable materials include metals, polymers, wood, and composite materials. In the present example, the front body is composed of a plastic core with an imbedded fabric reinforcing layer. The reinforcing layer may be comprised of a variety of high tensile strength materials, including fiberglass or Kevlar.

Middle Body

The role of middle body 108 is to retain fishing lure 100 on fishing line 126. Further, middle body 108 links front body 101 and aft body 111. Additionally, middle body 108 cooperates with front body 101 to enable fishing lure 100 to jump up from the water surface after being submerged.

With reference to FIGS. 1-15, middle body 108 extends along the longitudinal axis. In the example shown in FIGS. 1-15, middle body 108 extends along the longitudinal axis from a third end 109 to a fourth end 110. Third end 109 is proximate second end 104

Figure 14:
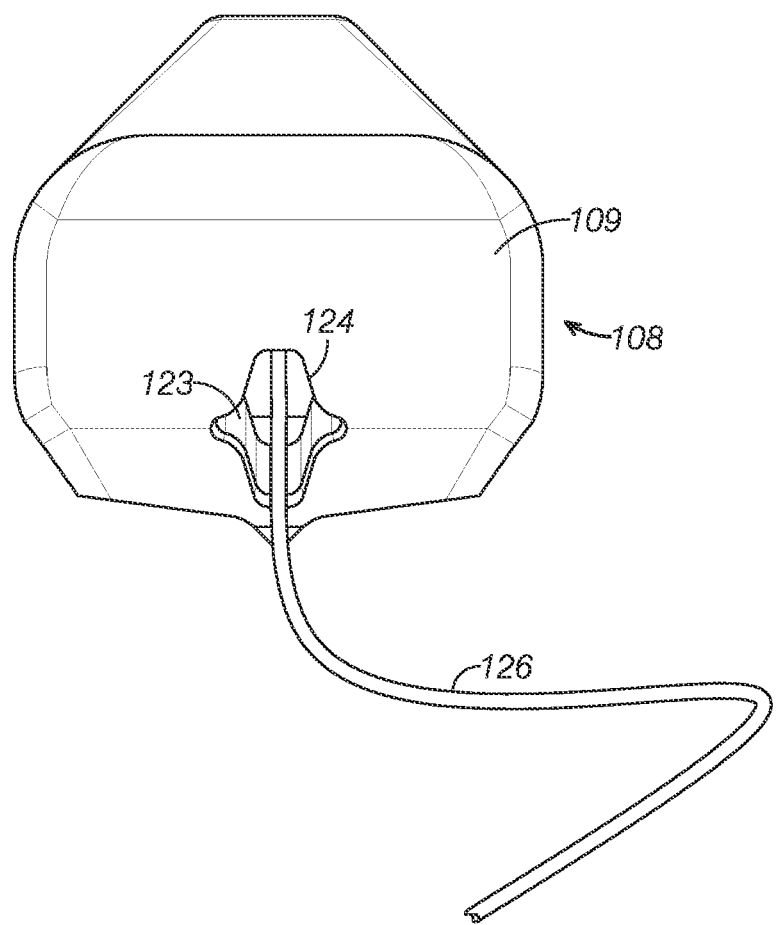
FIG. 14 is a front view of a middle body of the fishing lure shown in FIG. 1 depicting a fishing line extending into a middle cavity of the middle body.
Figure 15:
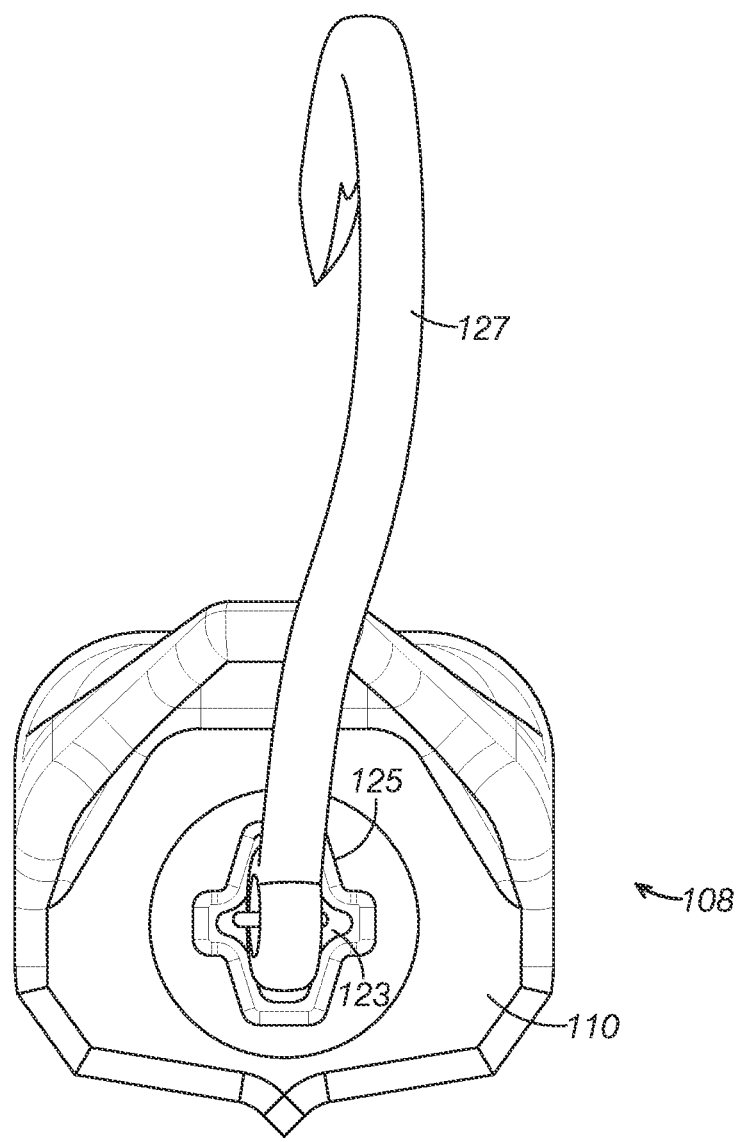
FIG. 15 is a rear view of the middle body of the fishing lure shown in FIG. 1 depicting a fishing hook extending partially into the middle cavity and restricted from passing entirely through the middle cavity.

The reader can see in FIGS. 14 and 15 that middle body 108 defines a middle cavity 123. Middle cavity 123 enables fishing lure 100 to be retained on fishing line 126 and is discussed in more detail below.

As shown in FIG. 6 and introduced above, middle body 108 is biased to pivot toward bottom side 117 into biased position 121 from loaded position 122. Middle body 108 includes an internal spring hinge mechanism (not pictured except for pivot shaft 142) linking front body 101 and middle body 108 and biasing middle body 108 to biased position 121 relative to front body 101.

As discussed above, the positive buoyancy of front body 101 and the bias of middle body 108 are complementarily configured and cooperate to cause fishing lure 100 to jump out of the water. First, the positive buoyancy of submerged front body 101 pivots middle body 108 from biased position 121 to loaded position 122. When fishing lure 100 reaches the surface, the bias of middle body 108 pushes front body 101 against the surface of the water to return to biased position 121. Middle body 108 pushing front body 101 against the water surface causes fishing lure 100 to jump up or buck from the surface of the water.

The bias of middle body 108 also absorbs shock when fishing lure 100 contacts the water after being airborne. Further, the bias of middle body 108 causes fishing lure 100 to adopt favorable flying orientations promoting aerodynamic stability and balance by shift weight of fishing lure 100 forward. The reader can see in FIGS. 5 and 6 that pivot shaft 142 is disposed proximate the wings' center of lift.

The size and shape of the middle body may be varied as needed for a given application. In some examples, the middle body is larger relative to the other components than depicted in the figures. In other examples, the middle body is smaller relative to the other components than depicted in the figures. Further, the middle body and the other components may all be larger or smaller than described herein while maintaining their relative proportions.

The middle body may be composed of any currently known or later developed material suitable for fishing lure applications. Suitable materials include metals, polymers, wood, and composite materials. In the present example, the middle body is composed of a plastic core with an imbedded fabric reinforcing layer. The reinforcing layer may be comprised of a variety of high tensile strength materials, including fiberglass or Kevlar.

Middle Cavity

Middle cavity 123 functions to retain fishing lure 100 on fishing line 126. Further, middle cavity 123 functions to restrict fishing hook 127 from being pulled out of fishing lure 100.

Middle cavity 123 extends along the longitudinal axis from a first cavity opening 124 to a second cavity opening 125. First cavity opening 124 is disposed proximate third end 109. Second cavity opening 125 is disposed proximate fourth end 110.

As depicted in FIG. 14, middle cavity 123 is complementarily configured with a fishing line 126. The complementarily configuration between middle cavity 123 and fishing line 126 enables fishing line 126 to pass through middle cavity 123. Fishing line 126 passing through middle cavity 126 retains fishing lure 100 on fishing line.

With reference to FIG. 15, middle cavity 123 is also complementarily configured with a fishing hook 127. The complementarily configuration between middle cavity 123 and fishing hook 127 restricts fishing hook 127 from passing entirely through middle cavity 123.

The size and shape of the middle cavity may be varied as needed for a given application. In some examples, the middle cavity is larger relative to the other components than depicted in the figures. In other examples, the middle cavity is smaller relative to the other components than depicted in the figures. Further, the middle cavity and the other components may all be larger or smaller than described herein while maintaining their relative proportions.

Aft Body

As shown in FIGS. 1, 2, 5, and 6, aft body 111 functions to present fishing hook 127 beyond fishing lure 100 to facilitate hooking a fish. The reader can see in FIG. 7 that aft body 111 also serves to allow fishing line 126 to extend out past fishing lure 100 when fishing hook 127 captures a fish. Allowing fishing line 126 to extend out beyond fishing lure 100 provides space between fishing lure 100 and the fish, which reduces the risk of the fish damaging fishing lure 100.

Figure 12:
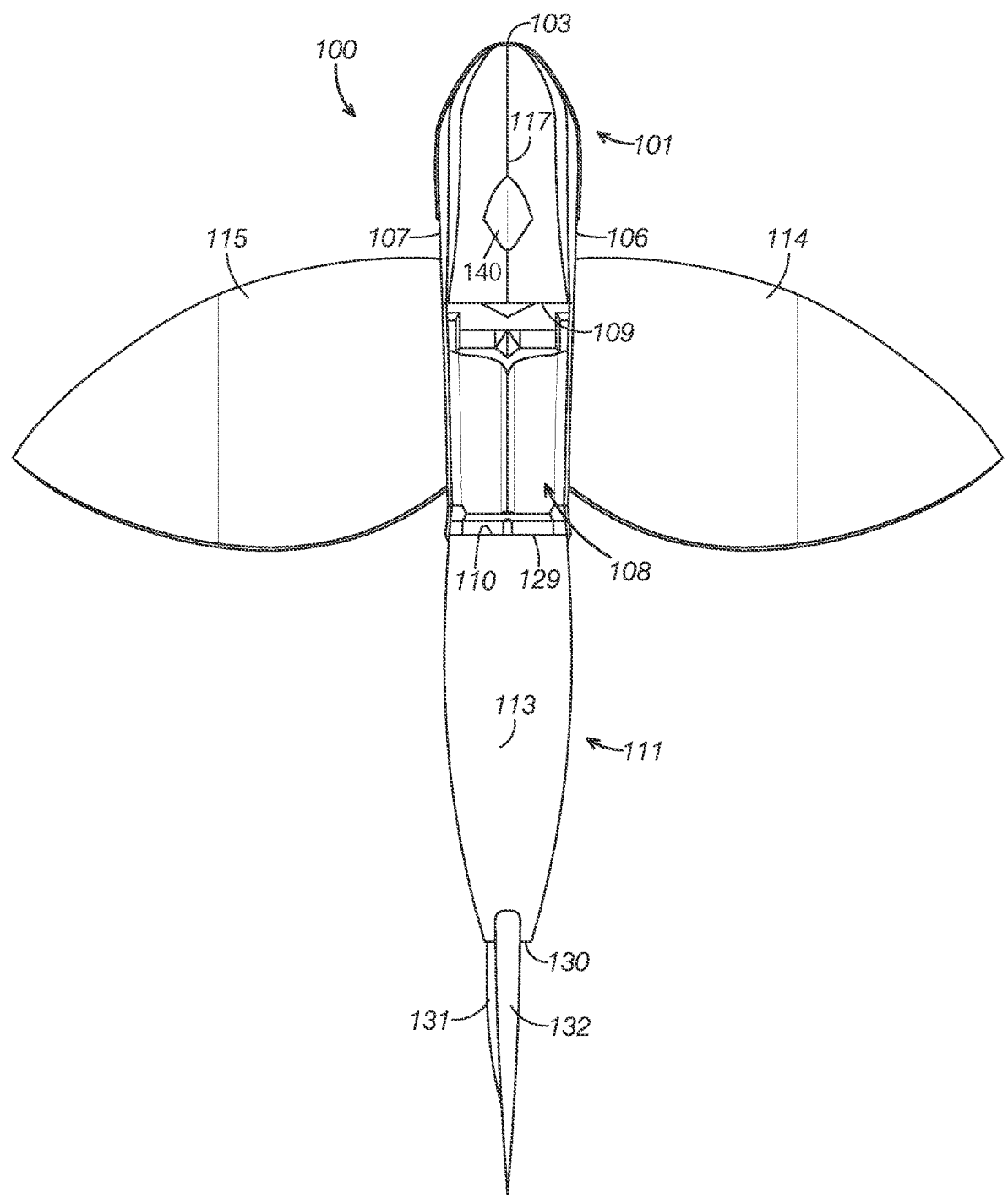
FIG. 12 is a top plan view of the fishing lure shown in FIG. 1.
Figure 13:
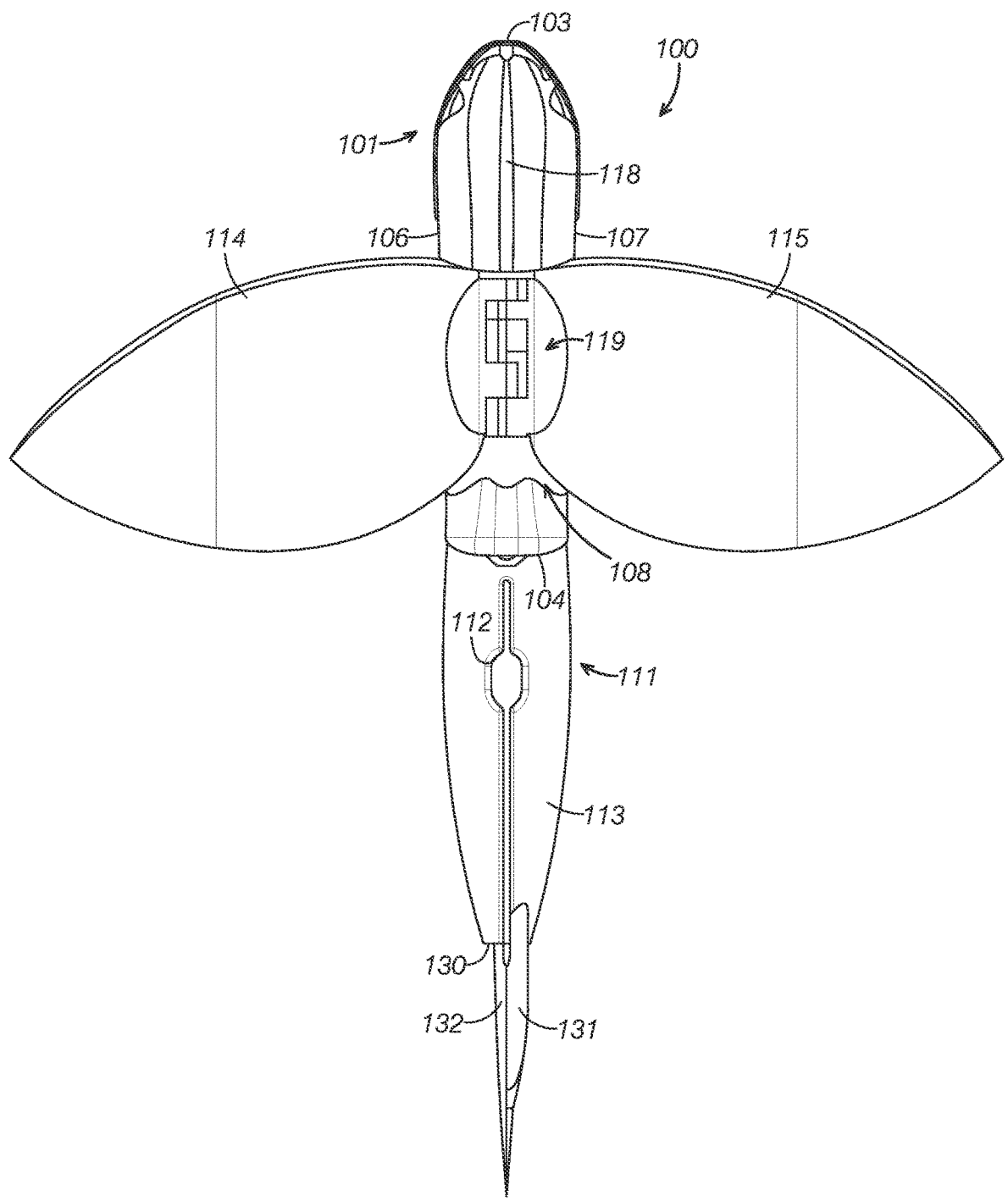
FIG. 13 is a bottom view of the fishing lure shown in FIG. 1.

As depicted in FIGS. 12 and 13, aft body 111 extends along the longitudinal axis. In the example shown in FIGS. 12 and 13, aft body 111 extends along the longitudinal axis from a fifth end 129 to a sixth end 130. Fifth end 129 is proximate to middle body 108 and sixth end 130 is distal to middle body 108.

As shown in FIG. 13, aft body 111 is coupled to middle body 108. In particular, fifth end 129 of aft body 111 is coupled to middle body 108 proximate fourth end 110. With reference to FIGS. 5, 6, 8, 9, and 11-13, aft body 111 couples to middle body 108 via an interference fit.

As can be seen in FIG. 13, aft body 111 defines a hook opening 112. The reader can see in FIGS. 1, 2, 5, 6, and 13 that aft body 111 defines an aft cavity 128 extending from hook opening 112. Hook opening 112 and aft cavity 128 are described in more detail in the sections below.

The size and shape of the aft body may be varied as needed for a given application. In some examples, the aft body is larger relative to the other components than depicted in the figures. In other examples, the aft body is smaller relative to the other components than depicted in the figures. Further, the aft body and the other components may all be larger or smaller than described herein while maintaining their relative proportions.

The aft body may be composed of any currently known or later developed material suitable for fishing lure applications. Suitable materials include metals, polymers, wood, and composite materials. In the present example, the aft body is composed of a plastic core with an imbedded fabric reinforcing layer. The reinforcing layer may be comprised of a variety of high tensile strength materials, including fiberglass or Kevlar.

Hook Opening

As shown in FIGS. 1, 2, 5, and 6, hook opening 112 functions to support fishing hook 127 in a position where fishing hook 127 extends beyond fishing lure 100. With reference to FIGS. 1, 2, 5, 6, and 13, hook opening 112 is configured to receive fishing hook 127 in a position where fishing hook 127 is projecting beyond an outer surface 113 of aft body 111. As shown in FIG. 13, hook opening 112 is disposed between fifth end 129 and sixth end 130 of aft body 111.

The size and shape of the hook opening may be varied as needed for a given application. In some examples, the hook opening is larger relative to the other components than depicted in the figures. In other examples, the hook opening is smaller relative to the other components than depicted in the figures. Further, the hook opening and the other components may all be larger or smaller than described herein while maintaining their relative proportions.

Aft Cavity

Aft cavity 128 functions to provide a conduit through aft body 111 for fishing line 126 and fishing hook 127 to move relative to aft body 111. As is apparent from FIG. 7, aft cavity 128 is complimentarily configured with fishing line 126 to allow fishing line 126 to move within aft cavity 128 beyond fishing lure 100.

As shown in FIG. 13, aft cavity 128 extends along the longitudinal axis. The reader can see in FIG. 13 that aft cavity 128 extends from hook opening 112 toward sixth end 130. As depicted in FIG. 13, aft cavity 128 also extends from hook opening 112 toward fifth end 129.

The size and shape of the aft cavity may be varied as needed for a given application. In some examples, the aft cavity is larger relative to the other components than depicted in the figures. In other examples, the aft cavity is smaller relative to the other components than depicted in the figures. Further, the aft cavity and the other components may all be larger or smaller than described herein while maintaining their relative proportions.

Wings

The role of the wings are to provide lift when fishing lure 100 is flying through the air and to stabilize fishing lure 100 when it swims through water. The wings also function to orient fishing lure 100 upright and to resist rolling when fishing lure 100 is submerged under water.

As depicted in FIGS. 1-13, first wing 114 is coupled to front body 101 and is disposed on first lateral side 106. The reader can see in FIGS. 1-4, 6, 8-10, 12, and 13 that second wing 115 is coupled to front body 101 and is disposed on second lateral side 107.

Figure 3:
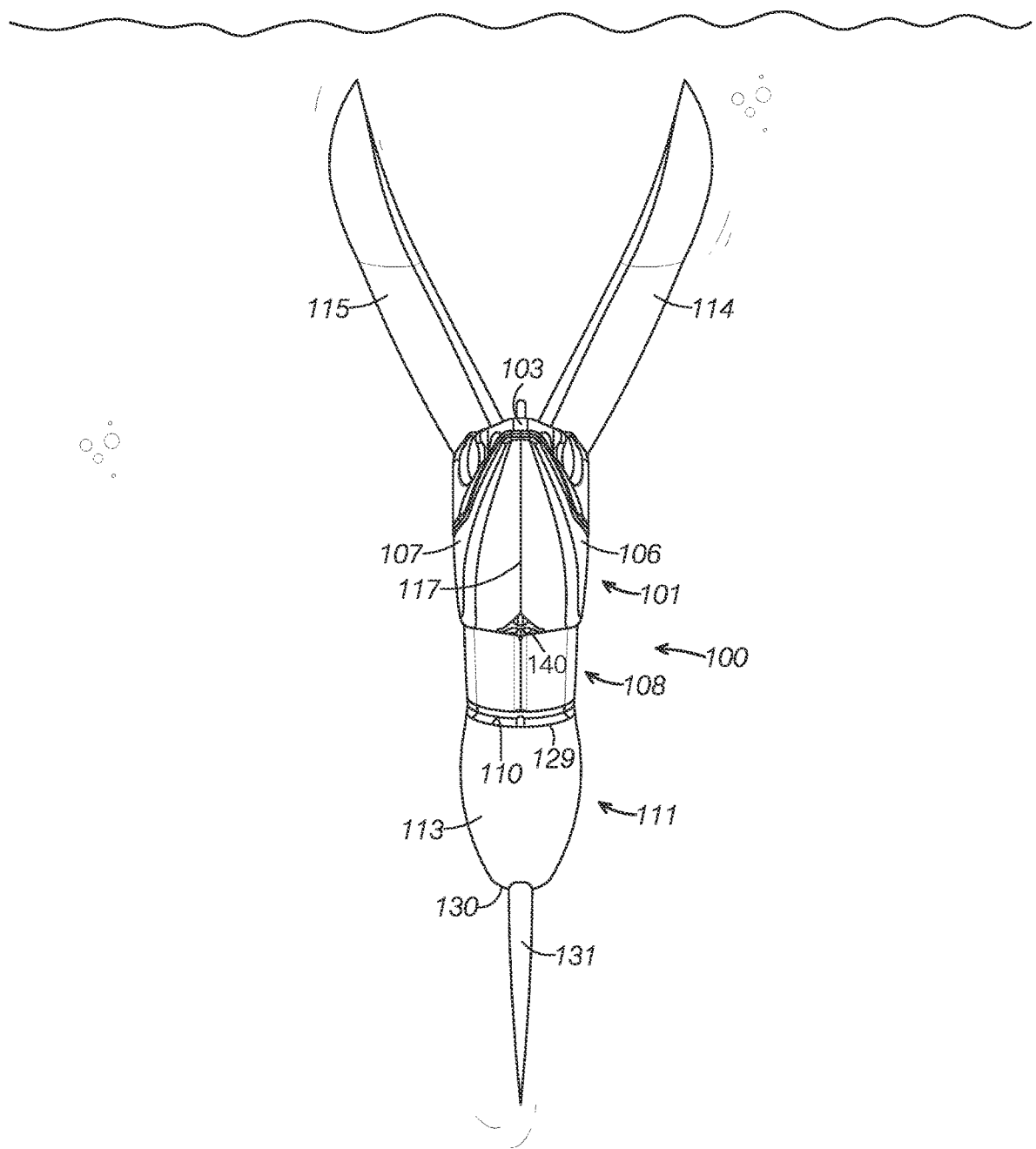
FIG. 3 is a front elevation view of the fishing lure shown in FIG. 1 depicted under water with wings pivoted upwards.
Figure 4:
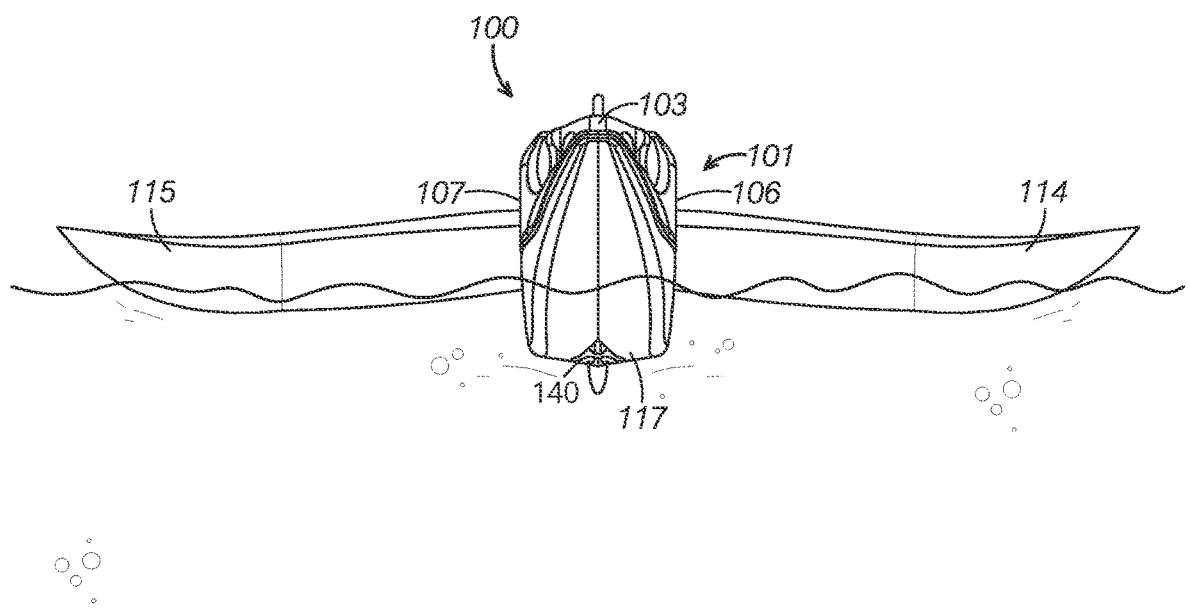
FIG. 4 is a front elevation view of the fishing lure shown in FIG. 1 depicted at the surface of the water with wings extending horizontally.

With reference to FIGS. 1-13, first wing 114 is pivotally coupled to front body 101 via hinge 119. The reader can see in FIGS. 1-4, 6, 8-10, 12, and 13 that second wing 115 is also pivotally coupled to front body 101 via hinge 119. As shown in FIG. 3, first wing 114 and second wing 115 are configured to pivot towards top side 118 beyond vertical orientations. In particular, the wings may pivot about hinge 119 past vertical orientations (more than 90 degrees) towards the opposite side in which they are biased and normally disposed.

With reference to FIG. 3, first wing 114 and second wing 115 are positively buoyant in water. When fishing lure 100 is submerged under water, first wing 114 and second wing 115 pivot towards top side 118 due to their positive buoyancy. The wings pivoting towards top side 118 under water helps orient top side 118 of front body 101 above bottom side 117 when fishing lure 100 emerges from the water.

As shown in FIGS. 4, 10, 11, and 13, first wing 114 and second wing 115 are biased to pivot toward bottom side 117. The wings being biased toward bottom side 117 positions the wings into a flight configuration shown in FIGS. 1 and 4 to generate lift when fishing lure 100 move through the air. The flight configuration of the wings also provides lateral stability and resists fishing lure 100 rolling when fishing lure 100 moves through the water and/or along the surface of the water.

The number of wings in the fishing lure may be selected to meet the needs of a given application. The reader should appreciate that the number of wings may be different in other examples than is shown in the figures. For instance, some fishing lure examples include additional or fewer wings than described in the present example.

The size and shape of the wings may be varied as needed for a given application. In some examples, the wings are larger relative to the other components than depicted in the figures. In other examples, the wings are smaller relative to the other components than depicted in the figures. Further, the wings and the other components may all be larger or smaller than described herein while maintaining their relative proportions.

In the present example, the wings are composed of plastic. However, the wings may be composed of any currently known or later developed material suitable for fishing lure applications. Suitable materials include metals, polymers, wood, and composite materials.

Hinge

Hinge 119 functions to support first wing 114 and second wing 115. Further, hinge 119 enables first wing 114 and second wing 115 to pivot relative to front body 101. In the present example, hinge 119 allows the wings to pivot past vertical (more than 90 degrees) towards the opposite side in which they are biased and normally disposed.

The reader can see in FIG. 13 that hinge 119 is coupled to front body 101. In the present example, hinge 119 couples to front body 101 at top side 118 of front body 101. The reader can see further in FIG. 13 that first wing 114 and second wing 115 couple to hinge 119.

The hinge may be any currently known or later developed type of hinge. Various hinge types exist and could be used in place of the hinge shown in the figures. In addition to the types of hinges existing currently, it is contemplated that the fishing lures described herein could incorporate new types of hinges developed in the future.

The number of hinges in the fishing lure may be selected to meet the needs of a given application. The reader should appreciate that the number of hinges may be different in other examples than is shown in the figures. For instance, some fishing lure examples include additional or fewer hinges than described in the present example.

The size and shape of the hinge may be vaned as needed for a given application. In some examples, the hinge is larger relative to the other components than depicted in the figures. In other examples, the hinge is smaller relative to the other components than depicted in the figures. Further, the hinge and the other components may all be larger or smaller than described herein while maintaining their relative proportions.

Tail Fins

The tail fins serve to stabilize fishing lure 100 as it moves through the air and water. The reader can see in FIGS. 1-3, 5-9, and 11-13 that first tail fin 131 and second tail fin 132 are coupled to aft body 111 proximate sixth end 130 of aft body 111. With reference to FIGS. 1-3, 5-9, and 11-13, first tail fin 131 extends to first lateral side 106. As depicted in FIGS. 1-3, 5-9, and 11-13, second tail fin 132 extends to second lateral side 107.

In the present example, fishing lure 100 includes two tail fins. However, the number of tail fins in the fishing lure may be selected to meet the needs of a given application. The reader should appreciate that the number of tail fins may be different in other examples than is shown in the figures. For instance, some fishing lure examples include additional or fewer tail fins than described in the present example.

The size and shape of the tail fins may be varied as needed for a given application. In some examples, the tail fins are larger relative to the other components than depicted in the figures. In other examples, the tail fins are smaller relative to the other components than depicted in the figures. Further, the tail fins and the other components may all be larger or smaller than described herein while maintaining their relative proportions.

In the present example, the tail fins are composed of plastic. However, the tail fins may be composed of any currently known or later developed material suitable for fishing lure applications. Suitable materials include metals, polymers, wood, and composite materials.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A fishing lure, comprising:
   a front body with an aerodynamic and hydrodynamic profile and positive buoyancy in water, the front body extending along a longitudinal axis from a first end to a second end and extending along a lateral axis from a first lateral side to a second lateral side;
   a middle body pivotally connected to the front body and disposed proximate the second end, the middle body extending along the longitudinal axis from a third end proximate the second end to a fourth end;
   an aft body coupled to the middle body proximate the fourth end and defining a hook opening configured to receive a hook projecting beyond an outer surface of the aft body;
   a first wing pivotally coupled to the front body and disposed on the first lateral side; and
   a second wing pivotally coupled to the front body and disposed on the second lateral side;
   wherein:
      the first wing and the second wing have a surface area and profile effective to generate lift sufficient for the fishing lure to fly above a water surface when the fishing lure is pulled forward;
      the front body extends along a vertical axis perpendicular to the longitudinal axis and to the lateral axis from a bottom side to a top side;

the first wing and the second wing are biased to pivot toward the bottom side into a flight configuration when the first wing and the second wing are above a water surface; and the first wing and the second wing are biased with sufficient force to maintain the first wing and the second wing in the flight configuration while the first wing and the second wing generate lift as the fishing lure is pulled forward.

2. The fishing lure of claim 1, further comprising a hinge coupled to the front body, the first wing, and the second wing.

3. The fishing lure of claim 1, wherein the first wing and the second wing are positively buoyant in water.

4. The fishing lure of claim 3, wherein the first wing and the second wing are configured to pivot towards the top side beyond vertical orientations when the fishing lure is submerged under water due to their positive buoyancy to orient the top side above the bottom side when the fishing lure emerges from the water.

5. The fishing lure of claim 1, wherein:
the front body extends along a vertical axis perpendicular to the longitudinal axis and to the lateral axis from a bottom side to a top side; and
the middle body is biased to pivot toward the bottom side into a biased position.

6. The fishing lure of claim 5, wherein the positive buoyancy of the front body and the bias of the middle body are complementarily configured and cooperate to cause the fishing lure to jump out of the water due to the positive buoyancy of the front body pivoting the middle body from the biased position to a loaded position until the fishing lure reaches the surface of the water and the bias of the middle body pushes the front body against the surface of the water to return to the biased position.

7. The fishing lure of claim 1, wherein the middle body defines a middle cavity extending along the longitudinal axis from a first cavity opening proximate the third end to a second cavity opening proximate the fourth end.

8. The fishing lure of claim 7, wherein the middle cavity is complementarily configured with a fishing line to allow the fishing line to pass through the middle cavity.

9. The fishing lure of claim 8, wherein the middle cavity is complementarily configured with a fishing hook to restrict the fishing hook from passing entirely through the middle cavity.

10. The fishing lure of claim 1, wherein the aft body defines an aft cavity extending from the hook opening and complimentarily configured with a fishing line to allow the fishing line to move within the aft cavity.

11. The fishing lure of claim 10, wherein the aft cavity extends along the longitudinal axis.

12. The fishing lure of claim 11, wherein:
the aft body extends along the longitudinal axis from a fifth end proximate the middle body to a sixth end distal the middle body;
the hook opening is disposed between the fifth end and the sixth end; and
the aft cavity extends from the hook opening toward the sixth end.

13. The fishing lure of claim 12, wherein the aft cavity also extends from the hook opening toward the fifth end.

14. The fishing lure of claim 1, wherein:
the aft body extends along the longitudinal axis from a fifth end proximate the middle body to a sixth end distal the middle body; and
the fishing lure includes a first tail fin coupled to the aft body proximate the sixth end.

15. The fishing lure of claim 14, wherein:
the fishing lure further comprises a second tail fin coupled to the aft body proximate the sixth end;
the first tail fin extends horizontally to the first lateral side; and
the second tail fin extends horizontally to the second lateral side.

16. The fishing lure of claim 1, wherein the aft body couples to the middle body via an interference fit.

* * * * *